(12) United States Patent
Nakagawa et al.

(10) Patent No.: US 7,030,194 B1
(45) Date of Patent: Apr. 18, 2006

(54) METHOD OF TREATING POLYMER

(75) Inventors: Yoshiki Nakagawa, Kobe (JP); Kenichi Kitano, Kobe (JP); Nao Fujita, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/926,254

(22) PCT Filed: Apr. 3, 2000

(86) PCT No.: PCT/JP00/02158

§ 371 (c)(1),
(2), (4) Date: Feb. 1, 2002

(87) PCT Pub. No.: WO00/59960

PCT Pub. Date: Oct. 12, 2000

(30) Foreign Application Priority Data

Apr. 2, 1999 (JP) ............................................. 11-95656

(51) Int. Cl.
*C08F 8/42* (2006.01)

(52) U.S. Cl. ..................................... 525/330.6; 525/366
(58) Field of Classification Search ................. 525/366, 525/330.6
See application file for complete search history.

(56) References Cited

U.S. PATENT DOCUMENTS

| 4,316,973 | A | * | 2/1982 | Kennedy | .................. | 525/333.7 |
|---|---|---|---|---|---|---|
| 4,808,664 | A | | 2/1989 | Saam | .......................... | 525/106 |
| 5,807,937 | A | | 9/1998 | Matyjaszewski et al. | ... | 526/135 |
| 6,103,380 | A | * | 8/2000 | Devonport | .................. | 428/403 |
| 6,274,688 | B1 | * | 8/2001 | Nakagawa et al. | | |
| 6,350,519 | B1 | * | 2/2002 | Devonport | .................. | 428/403 |
| 6,423,787 | B1 | * | 7/2002 | Kitano et al. | ................ | 525/366 |

FOREIGN PATENT DOCUMENTS

| EP | 0 201 371 | 11/1986 |
|---|---|---|
| EP | 0 343 526 | 11/1989 |
| EP | 0 549 064 | 6/1993 |
| EP | 0 789 036 | 8/1997 |
| EP | 0 845 479 | 6/1998 |
| EP | 0 976 766 | 2/2000 |
| WO | WO 98/01480 | 1/1998 |
| WO | WO 98/47931 | 10/1998 |

OTHER PUBLICATIONS

March, J, "Advanced Organic Chemistry", 4$^{th}$ ed., John Wiley & Sons, New York, pp 398–399 (1992).*

* cited by examiner

*Primary Examiner*—Bernard Lipman
(74) *Attorney, Agent, or Firm*—Westerman, Hattori, Daniels & Adrian, LLP

(57) ABSTRACT

To eliminate a halogen group of a halogen group-terminated vinyl polymer, the present invention provides a method to treat said polymer with an oxy anion compound to thereby eliminate a terminal halogen group easily. Thus, it is possible to improve the storage stability of the polymer or a curable composition comprising said polymer and to prevent various materials coming into contact with the reaction apparatus or the polymer from being corroded. In particular, it is possible to improve the storage stability of a crosslinkable silyl group-containing polymer.

20 Claims, No Drawings

METHOD OF TREATING POLYMER

TECHNICAL FIELD

The present invention relates to a method of treating the terminal halogen group of a vinyl polymer.

BACKGROUND ART

It is known that polymers having a main chain terminated in an alkenyl group as a crosslinkable functional group, when subjected to the reaction with a hydrosilyl group-containing compound as a curing agent or to photoreaction, is crosslinked and gives curing products excellent in heat resistance, durability and other properties. As examples of the main chain skeleton of such polymer having an alkenyl group-terminated main chain, there maybe mentioned, among others, polyether polymers such as polyethylene oxide; hydrocarbon polymers such as polyisobutylene, polybutadiene, polyisoprene and polychloroprene, and hydrogenated derivatives thereof; and polyester polymers such as polyethylene terephthalate, polybutylene terephthalate and polycaprolactone. These are used in various fields of application according to the main chain skeleton and the mode of crosslinking.

While these polymers are obtained by ionic polymerization or polycondensation, vinyl polymers obtained by radical polymerization and having a crosslinkable functional group-terminated main chain have scarcely been put to practical use. Among vinyl polymers, (meth)acrylic polymers have such characteristic features as high weathering resistance and transparency that the above-mentioned polyether polymers or polyester polymers cannot have. Thus, for example, (meth)acrylic polymers having an alkenyl group on side chains, not at either main chain terminus, are utilized in high weathering resistance coatings.

In contrast to such vinyl polymers having an alkenyl group on side chains, vinyl polymers having an alkenyl group-terminated main chain can give curing products with good curing characteristics. Therefore, a large number of researchers have endeavored to develop a simple and easy method of producing them. It is not easy, however, to produce them on an industrial scale. Japanese Kokai Publication Hei-04-132706 discloses a method of introducing a hydroxyl group by converting a halogen group at a polymer terminus. In crosslinking a polymer having a hydroxyl group-terminated main chain, however, it is necessary in many instances to use an isocyanate, which may pose a toxicity and/or stability problem. Hence, an alkenyl group or a crosslinkable silyl group is preferred as the crosslinkable terminal group.

Japanese Kokai Publication Hei-01-247403 discloses a method of synthesizing vinyl polymers having an alkenyl group at each of both termini which comprises using an alkenyl group-containing disulfide as a chain transfer agent. Further, Japanese Kokai Publication Hei-06-211922 discloses a method of synthesizing vinyl polymers having and alkenyl group at each of both termini which comprises synthesizing a vinyl polymer having a hydroxyl group at each of both termini using a hydroxyl-containing disulfide as a chain transfer agent and further introducing the alkenyl group into each terminus by utilizing the reactivity of the hydroxyl group. These methods, however, require the use of the chain transfer agent in large amounts for introducing the alkenyl group into both termini without fail, producing problems from the production process viewpoint. In addition, these methods employ the conventional radical polymerization, hence it is very difficult to control the molecular weight and molecular weight distribution (ratio between weight average molecular weight and number average molecular weight) of the polymer to be obtained.

Recently, the present inventors have succeeded in introducing various functional groups such as alkenyl, crosslinkable silyl and hydroxyl groups terminally into vinyl polymers by utilizing the technology of controlled radical polymerization, preferably living radical polymerization, more preferably atom transfer radical polymerization (see, for example, Japanese Kokai Publication Hei-11-080249, Japanese Kokai Publication Hei-11-080250, Japanese Kokai Publication Hei-11-005815, Japanese Kokai Publication Hei-11-116617, Japanese Kokai Publication Hei-11-116606, Japanese Kokai Publication Hei-11-080571, Japanese Kokai Publication Hei-11-080570, Japanese Kokai Publication Hei-11-130931, Japanese Kokai Publication Hei-11-100433, Japanese Kokai Publication Hei-11-116763, Japanese Kokai Publication Hei-09-272714 and Japanese Kokai Publication Hei-09-272715).

On the other hand, in cases where the polymer contains a halogen, the halogen may cause various problems in using this polymer in various fields of application. For example, it may corrode metals in contact therewith, or reduce the storage stability of curable compositions comprising the polymer. In cases where the polymer is a product obtained by atom transfer radical polymerization, for instance, the polymer terminus or termini have a halogen introduced therein and, therefore, such problems as mentioned above become more serious.

Meanwhile, WO 99/54365 discloses a method of eliminating a halogen group from polymer terminus as halogen-containing compound by utilizing addition and elimination reactions of a specific double bond-containing compound. By this method, however, an acidic compound such as a hydrogen halide will be produced. In addition, unexpected side reactions such as crosslinking reactions may possibly proceed.

In view of the above-mentioned state of the art, it is an object of the present invention to reduce the halogen content of a halogen-containing polymer and thus provide a polymer and a curable composition, without producing such problems as corrosion of metals in contact with the same or reduction in storage stability.

DISCLOSURE OF INVENTION

The present invention relates to a production method of a vinyl polymer with a reduced halogen content comprising treating a halogen group-containing vinyl polymer (I) with an oxy anion compound to thereby reduce the halogen content of the polymer.

It is preferred that the vinyl polymer (I) has a halogen group at a molecular chain terminus.

It is also preferred that the vinyl polymer (I) has a functional group other than a halogen group in a terminal structure thereof in addition to the above-mentioned halogen group.

It is preferred that the vinyl polymer (I), but not limited to, has at least one group selected from the group consisting of alkenyl, silyl, epoxy, hydroxyl and amino groups in the terminal structure thereof.

When the vinyl polymer (I) has an alkenyl group in a terminal structure thereof, after the elimination of the halogen group by means of an oxy anion compound, it is preferred that a crosslinkable silyl group-containing hydrosilane compound is caused to be added to the alkenyl group.

The oxy anion compound is not limited to any particular species but is preferably one having no functional group other than an oxy anion group.

The oxy anion compound is preferably one having a group represented by the general formula 1, it is more preferred that in the general formula 1, $R^1$ is an organic group represented by the general formula 2.

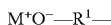

$$M^+O^-\text{---}R^1\text{---} \qquad (1)$$

In the formula, $R^1$ represents an organic group, which may optionally contain one or more ether or ester linkages, and $M^+$ represents an alkali metal ion or a quaternary ammonium ion.

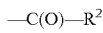

$$\text{---}C(O)\text{---}R^2 \qquad (2)$$

In the formula, $R^2$ represents an organic group, which may optionally contain one or more ether or ester linkages.

In the general formula 1 or 2, $R^1$ or $R^2$ is preferably a univalent or bivalent organic group.

In the general formula 2, $R^2$ is preferably an aromatic group.

In the general formula 1, $M^+$ is preferably a potassium ion.

The oxy anion compound preferably comprises at least one salt selected from the group consisting of alkoxide salts, phenoxide salts and carboxylate salts, and the counter ion thereto is preferably an alkali metal ion or a quaternary ammonium ion.

A univalent or bivalent carboxylate salt is more preferred among others, and more preferred is the one derived from any of benzoic acids or an acetic acid.

The vinyl polymer (I) is preferably one produced by atom transfer radical polymerization.

The terminal halogen group of the vinyl polymer (I) is not particularly restricted but may be one having a structure represented by the general formula 3.

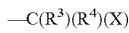

$$\text{---}C(R^3)(R^4)(X) \qquad (3)$$

In the formula, $R^3$ and $R^4$ are the same or different and each represents a hydrogen atom or a univalent organic group respectively derived from the group bound to the polymerizable carbon—carbon double bond group in the vinyl monomer constituting the above-mentioned polymer, and X represents a chlorine, bromine or iodine.

As the terminal halogen group of the vinyl polymer (I), in atom transfer radical polymerization, there may be mentioned a halogen group resulting from addition of an olefin compound having low polymerizability to a polymer terminus upon addition of the olefin compound during or at the end of the polymerization.

A main chain of the vinyl polymer (I) is preferably a (meth)acrylic polymer or a styrenic polymer, more preferably an acrylic polymer.

It is preferred a ratio (Mw/Mn) between weight average molecular weight (Mw) and number average molecular weight (Mn) of the vinyl polymer (I) is less than 1.8 as determined by gel permeation chromatography.

The number average molecular weight of the vinyl polymer (I) is preferably within the range of 500 to 100,000.

The present invention is also directed to a vinyl polymer with the halogen group eliminated therefrom by the method mentioned above.

The present invention is further directed to a curable composition which comprises the vinyl polymer having a crosslinkable silyl group in a terminal structure thereof as treated by the method mentioned above.

The present invention is still further directed to a curable composition which comprises (A) the polymer having an alkenyl group in a terminal structure thereof as treated by the method mentioned above and (B) a hydrosilyl group-containing compound.

In the following, the present invention is described in detail.

The present invention is concerned with a production method of vinyl polymers which comprises treating a halogen group-terminated vinyl polymer (I) with an oxy anion compound to thereby reduce the halogen content of the polymer.

The oxy anion compound is not limited to a particular species but preferably has no functional group other than oxy anion group so that the physical properties of the vinyl polymer to be treated may not be influenced as far as possible upon treatment of the halogen group.

The oxy anion compound preferably has a group represented by the general formula 1, more preferably, in the general formula 1, $R^1$ is a group represented by the general formula 2.

$$M^{+-}\text{---}R^1\text{---} \qquad (1)$$

In the formula, $R^1$ represents an organic group, which may optionally contain one or more ether or ester linkages, and $M^+$ represents an alkali metal ion or a quaternary ammonium ion.

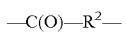

$$\text{---}C(O)\text{---}R^2\text{---} \qquad (2)$$

In the formula, $R^2$ represents a direct bond or an organic group, which may optionally contain one or more ether or ester linkages.

Referring to the above general formula (1) or (2), $R^1$ and $R^2$ represent organic groups, which may optionally contain one or more ether or ester linkages. The organic groups may be univalent, bivalent, trivalent or tetravalent but is preferably univalent or bivalent.

Preferably, $R^1$ and $R^2$ in the general formula (1) and (2) are respectively a univalent or bivalent hydrocarbon group containing 1 to 20 carbon atoms.

The univalent organic group specifically includes, but is not limited to, the following groups:
—$(CH_2)_n$—$CH_3$, —$CH(CH_3)$—$(CH_2)_n$—$CH_3$, —$CH(CH_2CH_3)$—$(CH_2)_n$—$CH_3$, —$CH(CH_2CH_3)_2$, —$C(CH_3)_2$—$(CH_2)_n$—$CH_3$, —$C(CH_3)(CH_2CH_3)$—$(CH_2)_n$—$CH_3$, —$C_6H_5$, —$C_6H_5(CH_3)$, —$C_6H_5(CH_3)_2$, —$(CH_2)_n$—$C_6H_5$, —$(CH_2)_n$—$C_6H_5(CH_3)$, —$(CH_2)_n$—$C_6H_5(CH_3)_2$
in the formula, n is an integer not less than 0 and the total number of carbon atoms in each group is not more than 20.

As typical examples of the bivalent organic group, there may be mentioned —$(CH_2)_n$—, in the formula, n represents an integer of 1 to 20; —$CH(CH_3)$—, —$CH(CH_2CH_3)$—, —$C(CH_3)_2$—, —$C(CH_3)(CH_2CH_3)$—, —$C(CH_2CH_3)_2$—, —$CH_2CH(CH_3)$—; —$(CH_2)_n$—O—, in each formula, n represents an integer of 1 to 20; —$CH(CH_3)$—O—, —$CH(CH_2CH_3)$—O—, —$C(CH_3)_2$—O—, —$C(CH_3)(CH_2CH_3)$—O—, —$C(CH_2CH_3)_2$—O—; —$(CH_2)_n$—O—$CH_2$—, in each formula, n represents an integer of 1 to 19; —$CH(CH_3)$—O—$CH_2$—, —$CH(CH_2CH_3)$—O—$CH_2$—, —$C(CH_3)_2$—O—$CH_2$—, —$C(CH_3)(CH_2CH_3)$—O—

—CH$_2$—, —C(CH$_2$CH$_3$)$_2$—O—CH$_2$—, —(CH$_2$)$_2$—O—C(O)—; —(CH$_2$)$_n$—OC(O)—(CH$_2$)$_m$, in each formula, m and n are the same or different, and represent an integer of 0 to 19 and satisfy 0≦m+n≦19; —(CH$_2$)$_n$—C(O)O—(CH$_2$)$_m$—, in the formula, m and n are the same or different and represent an integer of 0 to 19, and satisfy 0≦m+n≦19; —CH$_2$—C(O)O—(CH$_2$)$_2$—O—CH$_2$—, —CH(CH$_3$)—C(O)O—(CH$_2$)$_2$—O—CH$_2$—, —CH(CH$_2$CH$_3$)—C(O)O—(CH$_2$)$_2$—O—, —C(CH$_3$)$_2$—C(O)O—, —C(CH$_3$)(CH$_2$CH$_3$)—C(O)O—, —C(CH$_2$CH$_3$)$_2$—C(O)O— and so forth.

In certain specific examples of the bivalent organic group, it may contain a benzene ring. Specific examples in this case are o-, m- or p-C$_6$H$_4$—, o-, m- or p-C$_6$H$_4$—CH$_2$—, o-, m- or p-C$_6$H$_4$—O—, o-, m- or p-C$_6$H$_4$—O—CH$_2$—, o-, m- or p-C$_6$H$_4$—O—CH(CH$_3$)—, o-, m- or p-C$_6$H$_4$—O—C(CH$_3$)$_2$—; o-, m- or p-C$_6$H$_4$—(CH$_2$)$_n$—, in each formula, n represents an integer of 0 to 14; o-, m- or p-C$_6$H$_4$—O—(CH$_2$)$_n$—, in each formula, n represents an integer of 0 to 14; o-, m- or p—CH$_2$—C$_6$H$_4$—, o-, m- or p-CH$_2$—C$_6$H$_4$—CH$_2$—, o-, m- or p-CH$_2$—C$_6$H$_4$—O—, o-, m- or p-CH$_2$—C$_6$H$_4$—O—CH$_2$—, o-, m- or p-CH$_2$—C$_6$H$_4$—O—CH(CH$_3$)—; o-, m- or p-CH$_2$—C$_6$H$_4$—O—C(CH$_3$)$_2$—; o-, m- or p-CH$_2$—C$_6$H$_4$—(CH$_2$)$_n$—, in each formula, n represents an integer of 0 to 13; o-, m- or p-CH$_2$—C$_6$H$_4$—O—(CH$_2$)$_n$—, in each formula, n represents an integer of 0 to 13; o-, m- or p-C$_6$H$_4$—C(O)O—, o- , m- or p-CH$_2$—C$_6$H$_4$—C(O)O—; o-, m- or p-C(O)—C$_6$H$_4$—C(O)O—(CH2)$_n$—, in each formula, n represents an integer of 0 to 12, and the like.

Referring to the above general formula 1, M$^+$ is a counter cation to the oxy anion and represents an alkali metal ion or a quaternary ammonium ion. The alkali metal ion includes a lithium ion, a sodium ion and a potassium ion, among others, preferably is a sodium ion or a potassium ion, and more preferably a potassium ion. The quaternary ammonium ion includes a tetramethylammonium ion, a tetraethylammonium ion, a trimethylbenzylammonium ion, a trimethyldodecylammonium ion, a tetrabutylammonium ion, a dimethylpiperidinium ion and so forth.

<Vinyl polymer (I)>
<Main chain of the polymer>

Various monomers can be used for constituting the main chain of the vinyl polymer (I) of the present invention, without any particular restriction. Thus, examples are (meth) acrylic monomers such as (meth)acrylic acid, methyl (meth) acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-pentyl (meth) acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, myristyl (meth) acrylate, palmityl (meth)acrylate, stearyl (meth)acrylate, eicosyl (meth)acrylate, phenyl (meth)acrylate, toluyl (meth) acrylate, benzyl (meth)acrylate, 2-methoxyethyl (meth) acrylate, 3-methoxybutyl (meth)acrylate, 2-hydoxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl) trimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth) acrylate, 2-perfluoromethyl-2-perfluoroethylmethyl (meth) acrylate, 2-perfluorohexylethyl (meth)acrylate, 2-perfluorodecylethyl (meth)acrylate and 2-perfluorohexadecylethyl (meth)acrylate; styrenic monomers such as styrene, vinyltoluene, α-methylstyrene, chlorostyrene and styrenesulfonic acid, and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid, maleic acid monoalkyl esters and dialkyl esters; fumaric acid; fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group-containing vinyl monomers such as acrylonitrile and methacrylonitrile; amide group-containing vinyl monomers such as acrylamide and methacrylamine; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol and so forth. These may be used singly or a plurality thereof may be copolymerized. Among them, styrenic monomers and (meth)acrylic monomers are preferred from the viewpoint of physical properties of products. More preferred are acrylic acid ester monomers and methacrylic acid ester monomers, among which butyl acrylate is further more preferred. In the practice of the invention, such preferred monomers may be copolymerized with another monomer or other monomers and, in that case, the preferred monomers preferably account for 40% by weight.

<Molecular weight and molecular weight distribution>

The vinyl polymer of the invention preferably has a molecular weight distribution, namely the ratio (Mw/Mn) between weight average molecular weight (Mw) and number average molecular weight (Mn), of less than 1.8, more preferably not more than 1.7, still more preferably not more than 1.6, in particular not more than 1.5, still further preferably not more than 1.4, most preferably not more than 1.3, as determined by gel permeation chromatography. In the practice of the invention, GPC measurements are generally carried out using polystyrene gel columns or the like, together with chloroform or tetrahydrofuran, for instance, as a mobile phase. The molecular weight values are determined on the polystyrene equivalent basis.

The number average molecular weight of the vinyl polymer (I) of the present invention is not limited to any particular range but preferably is within the range of 500 to 100,000, more preferably 3,000 to 40,000. If the molecular weight is below 500, the characteristics intrinsic in vinyl polymers will hardly be manifested and, if it is above 100,000, polymer handling becomes difficult.

<Method of polymerization>

A production method of halogen group-terminated vinyl polymers according to the present invention is not particularly restricted.

In the practice of the present invention, the polymer main chain is preferably produced by living radical polymerization or radical polymerization using a chain transfer agent, and the former is particularly preferred, although vinyl polymers are generally produced by anionic polymerization or radical polymerization.

The radical polymerization methods, which may be used in synthesizing the vinyl polymer (I) of the invention, can be classified into "ordinary radical polymerization methods" comprising copolymerizing a monomer having a specific functional group with a vinyl monomer using an azo compound or peroxide as a polymerization initiator and "controlled radical polymerization methods" by which a specific functional group can be introduced at a controlled site, for example at a terminus.

Although the "ordinary radical polymerization methods" are simple and easy, a specific functional group-containing monomer is introduced in a polymer only at random by these methods and, therefore, for obtaining a highly functionalized polymer, it is necessary to use a large amount of that monomer. If, conversely, that monomer is used in a small amount, there arises the problem that the proportion of polymer molecules without having that specific functional group introduced therein increases. A further problem is that the methods consist in free radical polymerization, polymers wide in molecular weight distribution and high in viscosity can only be obtained.

The "controlled radical polymerization methods" can be further classified into "chain transfer agent methods" by which functional group-terminated vinyl polymers can be obtained by carrying out the polymerization using a chain transfer agent containing a specific functional group and "living radical polymerization methods" by which a growing polymer terminus can grow without undergoing any termination or like reaction and which thus can give polymers having a molecular weight approximately as designed.

The "chain transfer agent methods" can give polymers with a high functionalization percentage but require the use of a fairly large amount, relative to the initiator, of a chain transfer agent having a specific functional group. Thus, there arise problems from an economic viewpoint, inclusive of problems with treatment. Like the above-mentioned "ordinary radical polymerization methods", they consist in free radical polymerization, hence there is the problem that only those polymers which are wide in molecular weight distribution and high in viscosity is obtainable.

Unlike these polymerization methods, the "living radical polymerization methods" can give polymers narrow in molecular weight distribution (about 1.1 to 1.5 in terms of Mw/Mn) and allow the molecular weight to be arbitrarily controlled by varying the charge amount ratio between a monomer and a initiator while termination reactions hardly occur in spite of the fact that they consist in that radical polymerization which is high in rate of polymerization and readily allows the termination reaction due to radical-to-radical coupling to occur, hence is thought to be difficult to control.

Thus, the "living radical polymerization methods" can give polymers narrow in molecular weight distribution and low in viscosity and, in addition, make it possible to introduce a monomer having a specific functional group into polymers at substantially arbitrary sites as desired, hence is preferred as a production method of such specific functional group-containing vinyl polymers.

Although the term "living polymerization", in its narrower sense, denotes that mode of polymer ation in which molecular chains grow while a terminus thereof always remain active, the term generally includes the pseudo living polymerization in which molecular chains grow while terminally inactivated species and terminally active species are in equilibrium. The latter definition applies to the present invention.

The "living radical polymerization methods" have been actively investigated in recent years by various groups of researchers. As examples thereof, there may be mentioned the method using a cobalt-porphyrin complex as reported in the Journal of the American Chemical Society, 1994, vol. 116, page 7943 ff, the method using a radical capping agent such as a nitroxide compound as reported in Macromolecules, 1994, vol. 27, pages 7228 ff, and the "atom transfer radical polymerization" (ATRP) in which an organic halide is used as an initiator and a transition metal complex as a catalyst.

Among the "living radical polymerization methods", the technique of "atom transfer radical polymerization" which comprises polymerizing a vinyl monomer using an organic halide or halosulfonyl compound as an initiator and a transition metal complex as a catalyst is more suited for use as a production methodof vinyl polymers having a specific functional group since it gives polymers terminated in a halogen or the like, which is relatively advantageous to functional group conversion reactions, and is high in degree of freedom in initiator or catalyst designing while it has the above-mentioned characteristics of "living radical polymerization". This technique of "atom transfer radical polymerization" is described, for example, in Matyjaszewski et al., Journal of the American Chemical Society, 1995, vol. 117, pages 5614 ff; Macromolecules, 1995, vol. 28, pages 7901 ff; Science, 1996, vol. 272, pages 866 ff; WO 96/30421, WO 97/18247, WO 98/01480, WO 98/40415; and Sawamoto et al., Macromolecules, 1995, vol. 28, pages 1721 ff.

Although any of those methods mentioned above may be used in the practice of the present invention without any particular restriction, the technique of controlled radical polymerization is basically utilized and, from the ease of control viewpoint, the technique of living radical polymerization is preferred and, in particular, when the atom transfer radical polymerization, which basically allows a halogen group to remain at a growing terminus, as mentioned later herein, is used, the effects of the present invention are efficiently produced.

First, the polymerization technique using a chain transfer agent, one of the controlled radical polymerization methods, is explained. The technique of radical polymerization using a chain transfer agent (telomer) for obtaining vinyl polymers having a terminal structure suited for the purpose of the present invention includes, but is not particularly restricted to, the following two modifications.

One method uses a halogenated hydrocarbon as a chain transfer agent to obtain halogen-terminated polymers, as disclosed in Japanese Kokai Publication Hei-04-132706 and the other uses a hydroxyl group-containing mercaptan or a hydroxyl group-containing polysulfide as a chain transfer agent to obtain hydroxyl-terminated polymers, as disclosed in Japanese Kokai Publication Sho-61-271306, Japanese Patent 2594402 and Japanese Kokai Publication Sho-54-47782.

The living radical polymerization is now described.

Among them, the method which uses a radical capping agent such as a nitroxide compound is first described. In this method of polymerization, a nitroxy free radical (=N—·), which is generally stable, is used as a radical capping agent. Such compound is not particularly restricted but preferably is a 2,2,6,6-substituted-1-piperidinyloxy radical, a 2,2,5,5-substituted-1-pyroridinyloxy radical or a cyclic hydroxy amine-derived nitroxy free radical. Suitable substituents are alkyl groups containing not more than 4 carbon atoms, such as methyl and ethyl groups The nitroxy free radical compound specifically includes, but is not limited to, 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical, N,N-di-tert-butylaminoxy radical and the like. Stable free radicals such as galvinoxyl free radical may be used in lieu of the nitroxy free radicals.

The radical capping agent mentioned above is used in combination with a radical generator. It is considered that the reaction product from the radical capping agent and the radical generator serves as a polymerization initiator to cause the polymerization of an addition-polymerizable monomer to proceed. The mixing ratio therebetween is not particularly restricted but suitably is 0.1 to 10 moles of radical initiator per mole of radical capping agent.

While various compounds can be used as the radical generator, peroxides capable of generating radicals under polymerization temperature conditions are preferred. Such peroxides include, but are not limited to, diacyl peroxides such as benzoyl peroxide and lauroyl peroxide, dialkyl peroxides such as dicumyl peroxide, and di-tert-butyl peroxide, peroxycarbonates such as diisopropyl peroxydicarbonate and bis(4-tert-butylcyclohexyl) peroxydicarbonate, and alkyl peresters such as tert-butyl peroxyoctoate and tert-butyl peroxybenzoate. In particular, benzoyl peroxide is preferred. Further, radical generators, for example radical-generating azo compounds such as azobisisobutyronitrile may also be used in lieu of the peroxides.

Alkoxyamine compounds such as illustrated below may be used as initiators instead of combinedly using a radical capping agent and a radical generator, as reported in Macromolecules, 1995, vol. 28, pages 2993 ff.

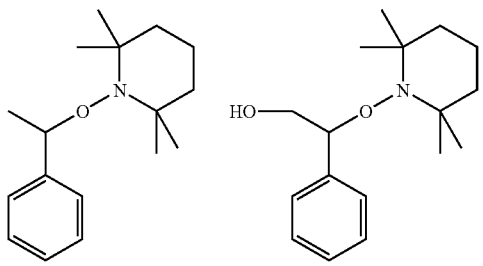

In cases where an alkoxyamine compound is used as an initiator, the use of one having a functional group such as a hydroxyl group, as illustrated above, leads to the formation of a functional group-terminated polymer.

The polymerization conditions, such as monomer, solvent and polymerization temperature, to be used in the polymerization using a radical capping agent such as the nitroxide compound mentioned above are not restricted but may be the same as in the atom transfer radical polymerization mentioned below.

Next, the atom transfer radical polymerization method, which is a more preferred mode of living radical polymerization in the practice of the present invention, is described.

In this atom transfer radical polymerization, an organic halide, in particular an organic halide having a highly reactive carbon-halogen bond (e.g. a carbonyl compound having a halogen at the α-position or a compound having a halogen at the benzyl position) or a halosulfonyl compound is used as an initiator.

Thus, a halogen group generally occurs at the terminus of atom transfer radical polymerization and, therefore, the method of the present invention produces very good effects.

Specific examples of the above initiator are:
$C_6H_5$—$CH_2X$, $C_6H_5$—$C(H)(X)CH_3$, $C_6H_5$—$C(X)(CH_3)_2$, in the above chemical formulas, $C_6H_5$ represents a phenyl group and X is a chlorine, bromine or iodine;
$R^5$—$C(H)(X)$—$CO_2R^6$, $R^5$—$C(CH_3)(X)$—$CO_2R^6$, $R^5$—$C(H)(X)$—$C(O)R^6$, $R^5$—$C(CH_3)(X)$—$C(O)R^6$, in each formula, $R^5$ and $R^6$ each is a hydrogen atom or an alkyl group containing 1 to 20 carbon atoms, an aryl group or an aralkyl group and X is a chlorine, bromine or iodine;

$R^5$—$C_6H_4$—$SO_2X$ in the above formula, $R^5$ is a hydrogen atom or an alkyl group containing 1 to 20 carbon atoms, an aryl group or an aralkyl group and X is a chlorine, bromine or iodine; and the like.

An organic halide or halosulfonyl compound having a functional group other than a functional group initiating the polymerization may also be used as the atom transfer radical polymerization initiator. In such case, vinyl polymers having a functional group atone main chain terminus and a halogen group at the other main chain terminus are produced. As such functional group, there may be mentioned alkenyl, crosslinkable silyl, hydroxyl, epoxy, amino and amide groups, and so forth.

The alkenyl group-containing organic halide includes, but is not limited to, one having the structure represented by the general formula 4, for instance:

$$R^8R^9C(X)-R^{10}-R^{11}C(R^7)=CH_2 \tag{4}$$

in the formula, $R^7$ is a hydrogen or a methyl group, $R^8$ and $R^9$ each represents a hydrogen or an univalent alkyl group containing 1 to 20 carbon atoms, an aryl group or an aralkyl group or $R^8$ and $R^9$ are bound to each other at their respective other ends, $R^{10}$ is —C(O)O— (ester group), —C(O)— (keto group) or o-, m- or p-phenylene group, R is a direct bond or a bivalent organic group containing 1 to 20 carbon atoms, which may optionally contain one or more ether linkages, and X is a chlorine, bromine or iodine.

As specific examples of the substituents $R^8$ and $R^9$, there may be mentioned a hydrogen, a methyl group, an ethyl group, a n-propyl group, an isopropyl group, a butyl group, a pentyl group, a hexyl group, etc. $R^8$ and $R^9$ may be bound together at their respective other ends to form a cyclic skeleton.

As typical examples of the alkenyl group-containing organic halide, there may be mentioned:
$XCH_2C(O)O(CH_2)_nCH=CH_2$, $H_3CC(H)(X)C(O)O(CH_2)_nCH=CH_2$, $(H_3C)_2C(X)C(O)O(CH_2)_nCH=CH_2$, $CH_3CH_2C(H)(X)C(O)O(CH_2)_nCH=CH_2$,

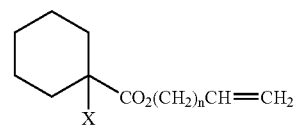

in each of the above formulas, X is a chlorine, bromine or iodine and n is an integer of 0 to 20;
$XCH_2C(O)O(CH_2)_nO(CH_2)_mCH=CH_2$, $H_3CC(H)(X)C(O)O(CH_2)_nO(CH_2)_mCH=CH_2$, $(H_3C)_2C(X)C(O)O(CH_2)_nO(CH_2)_mCH=CH_2$, $CH_3CH_2C(H)(X)C(O)O(CH_2)_nO(CH_2)_mCH=CH_2$,

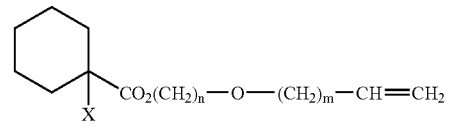

in each of the above formulas, X is a chlorine, bromine or iodine, n is an integer of 1 to 20 and m is an integer of 0 to 20;

o-, m- or p-XCH$_2$—C$_6$H$_4$—(CH$_2$)$_n$—CH=CH$_2$, o-, m- or p-CH$_3$C(H)(X)—C$_6$H$_4$—(CH$_2$)$_n$—CH=CH$_2$, o-, m- or p-CH$_3$CH$_2$C(H)(X)—C$_6$H$_4$—(CH$_2$)$_n$—CH=CH$_2$ in each of the above formulas, X is a chlorine, bromine or iodine and n is an integer of 0 to 20;

o-, m- or p-XCH$_2$—C$_6$H$_4$—(CH$_2$)$_n$—O—(CH$_2$)$_m$—CH=CH$_2$, o-, m- or p-CH$_3$C(H)(X)—C$_6$H$_4$—(CH$_2$)$_n$—O—(CH$_2$)$_m$—CH=CH$_2$, o-, m- or p-CH$_3$CH$_2$C(H)(X)—C$_6$H$_4$—(CH$_2$)$_n$—O—(CH$_2$)$_m$CH=CH$_2$ in each of the above formulas, X is a chlorine, bromine or iodine, n is an integer of 1 to 20 and m is an integer of 0 to 20;

o-, m- or p-XCH$_2$—C$_6$H$_4$—O—(CH$_2$)$_n$—CH=CH$_2$, o-, m- or p-CH$_3$C(H)(X)—C$_6$H$_4$—O—(CH$_2$)$_n$—CH=CH$_2$, o-,m- or p-CH$_3$CH$_2$C(H)(X)—C$_6$H$_4$—O—(CH$_2$)$_n$—CH=CH$_2$ in each of the above formulas, X is a chlorine, bromine or iodine and n is an integer of 0 to 20;

o-, m- or p-XCH$_2$—C$_6$H$_4$—O—(CH$_2$)$_n$—O—(CH$_2$)$_m$—CH=CH$_2$, o-, m- or p-CH$_3$C(H)(X)—C$_6$H$_4$—O—(CH$_2$)$_n$—O—(CH$_2$)$_m$—CH=CH$_2$, o-, m- or p-CH$_3$CH$_2$C(H)(X)—C$_6$H$_4$—O—(CH$_2$)$_n$—O—(CH$_2$)$_m$—CH=CH$_2$ in each of the above formulas, X is a chlorine, bromine or iodine, n is an integer of 1 to 20 and m is an integer of 0 to 20.

As the alkenyl group-containing organic halide, there may further be mentioned compounds represented by the general formula 5:

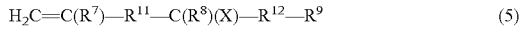  (5)

in the formula, R$^7$, R$^8$, R$^9$, R$^{11}$ and X are as defined above and R$^{12}$ represents a direct bond, —C(O)O— (ester group), —C(O)— (keto group) or o-, m- or p-phenylene group.

R$^{10}$ is a direct bond or a bivalent organic group containing 1 to 20 carbon atoms (which may optionally contain one or more ether linkages). When it is a direct bond, a vinyl group is bound to the carbon atom to which a halogen is bound, hence the compound is an allyl halide compound. In this case, the carbon-halogen bond is activated by the neighboring vinyl group and, therefore, it is not always necessary for R$^{12}$ to be a C(O)O or phenylene group but it may be a direct bond. In cases where R$^{11}$ is other than a direct bond, R$^{12}$ is preferably a C(O)O, C(O) or phenylene group so that the carbon-halogen bond may be activated.

Specific examples of the compound of the general formula 5 are:
CH$_2$=CHCH$_2$X, CH$_2$=C(CH$_3$)CH$_2$X, CH$_2$=CHC(H)(X) CH$_3$, CH$_2$=C(CH$_3$)C(H)(X)CH$_3$, CH$_2$=CHC(X)(CH$_3$)$_2$, CH$_2$=CHC(H)(X)C$_2$H$_5$, CH$_2$=CHC(H)(X)CH(CH$_3$)$_2$, CH$_2$=CHC(H)(X)C$_6$H$_5$, CH$_2$=CHC(H)(X)CH$_2$C$_6$H$_5$, CH$_2$=CHCH$_2$C(H)(X)—CO$_2$R, CH$_2$=CH(CH$_2$)$_2$C(H)(X)—CO$_2$R, CH$_2$=CH(CH$_2$)$_3$C(H)(X)—CO$_2$R, CH$_2$=CH(CH$_2$)$_8$C(H)(X)—CO$_2$R, CH$_2$=CHCH$_2$C(H)(X)—C$_6$H$_5$, CH$_2$=CH(CH$_2$)$_2$C(H)(X)—C$_6$H$_5$, CH$_2$=CH(CH$_2$)$_3$C(H)(X)—C$_6$H$_5$ in each of the above formulas, X is a chlorine, bromine or iodine and R is an alkyl group containing 1 to 20 carbon atoms, an aryl group or an aralkyl group.

Specific examples of the alkenyl group-containing halosulfonyl compound are:
o-, m- or p-CH$_2$=CH—(CH$_2$)$_n$—C$_6$H$_4$—SO$_2$X, o-, m- or p-CH$_2$=CH—(CH$_2$)$_n$—O—C$_6$H$_4$—SO$_2$X in each of the above formulas, X is a chlorine, bromine or iodine and n is an integer of 0 to 20, and the like.

The crosslinkable silyl group containing organic halide mentioned above is not particularly restricted but includes, for example, compounds having the structure represented by the general formula 6:

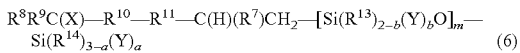  (6)

in the formula, R$^7$, R$^8$, R$^9$, R$^{10}$, R$^{11}$ and X are as defined above, R$^{13}$ and R$^{14}$ each represents an alkyl group containing 1 to 20 carbon atoms, an aryl group or an aralkyl group or a triorganosiloxy group represented by (R')$_3$SiO— (R' is a univalent hydrocarbon group containing 1 to 20 carbon atoms and the three R' groups may be the same or different) and, when there are two or more R$^{13}$ or R$^{14}$ groups, they may be the same or different; Y represents a hydroxyl or hydrolysable group and, when there are two or more Y groups, they may be the same or different; a represents 0, 1, 2 or 3 and b represents 0, 1 or 2 and m is an integer of 0 to 19 provided that the relation a+mb≧1 should be satisfied.

Specific examples of the compound of the general formula 6 are:
XCH$_2$C(O)O(CH$_2$)$_n$Si(OCH$_3$)$_3$, CH$_3$C(H)(X)C(O)O(CH$_2$)$_n$Si(OCH$_3$)$_3$, (CH$_3$)$_2$C(X)C(O)O(CH$_2$)$_n$Si(OCH$_3$)$_3$, XCH$_2$C(O)O(CH$_2$)$_n$Si(CH$_3$)(OCH$_3$)$_2$, CH$_3$C(H)(X)C(O)O(CH$_2$)$_n$Si(CH$_3$)(OCH$_3$)$_2$, (CH$_3$)$_2$C(X)C(O)O(CH$_2$)$_n$Si(CH$_3$)(OCH$_3$)$_2$ in each of the above formulas, X is a chlorine, bromine or iodine and n is an integer of 0 to 20;
XCH$_2$C(O)O(CH$_2$)$_n$O(CH$_2$)$_m$Si(OCH$_3$)$_3$, H$_3$CC(H)(X)C(O)O(CH$_2$)$_n$O(CH$_2$)$_m$Si(OCH$_3$)$_3$, (H$_3$C)$_2$C(X)C(O)O(CH$_2$)$_n$O(CH$_2$)$_m$Si(OCH$_3$)$_3$, CH$_3$CH$_2$C(H)(X)C(O)O(CH$_2$)$_n$O(CH$_2$)$_m$ Si(OCH$_3$)$_3$, XCH$_2$C(O)O(CH$_2$)$_n$O(CH$_2$)$_m$Si(CH$_3$)(OCH$_3$)$_2$, H$_3$CC(H)(X)C(O)O(CH$_2$)$_n$O(CH$_2$)$_m$—Si(CH$_3$)(OCH$_3$)$_2$, (H$_3$C)$_2$C(X)C(O)O(CH$_2$)$_n$O(CH$_2$)$_m$—Si(CH$_3$)(OCH$_3$)$_2$, CH$_3$CH$_2$C(H)(X)C(O)O(CH$_2$)$_n$O(CH$_2$)$_m$—Si(CH$_3$)(OCH$_3$)$_2$ in each of the above formulas, X is a chlorine, bromine or iodine, n is an integer of 1 to 20 and m is an integer of 0 to 20;

o-, m- or p-XCH$_2$—C$_6$H$_4$—(CH$_2$)$_2$Si(OCH$_3$)$_3$, o-, m- or p-CH$_3$C(H)(X)—C$_6$H$_4$—(CH$_2$)$_2$Si(OCH$_3$)$_3$, o-, m- or p-CH$_3$CH$_2$C(H)(X)—C$_6$H$_4$—(CH$_2$)$_2$Si(OCH$_3$)$_3$, o-, m- or p-XCH$_2$—C$_6$H$_4$—(CH$_2$)$_3$Si(OCH$_3$)$_3$, o-, m- or p-CH$_3$C(H)(X)—C$_6$H4—(CH$_2$)$_3$Si(OCH$_3$)$_3$, o-, m- or p-CH$_3$CH$_2$C(H)(X)—C$_6$H$_4$—(CH$_2$)$_3$Si(OCH$_3$)$_3$, o-, m- or p-XCH$_2$—C$_6$H$_4$—(CH$_2$)$_2$O—(CH$_2$)$_3$Si(OCH$_3$)$_3$, o-, m- or p-CH$_3$C(H)(X)—C$_6$H$_4$—(CH$_2$)$_2$O—(CH$_2$)$_3$Si(OCH$_3$)$_3$, o-, m- or p-CH$_3$CH$_2$C(H)(X)—C$_6$H$_4$—(CH$_2$)$_2$—O—(CH$_2$)$_3$Si(OCH$_3$)$_3$, o-, m- or p-XCH$_2$—C$_6$H$_4$—O—(CH$_2$)$_3$Si(OCH$_3$)$_3$, o-, m- or p-CH$_3$C(H)(X)—C$_6$H$_4$—O—(CH$_2$)$_3$Si(OCH$_3$)$_3$, o-, m- or p-CH$_3$CH$_2$C(H)(X)—C$_6$H$_4$—O—(CH$_2$)$_3$—Si(OCH$_3$)$_3$, o-, m- or p-XCH$_2$—C$_6$H$_4$—O—(CH$_2$)$_2$—O—(CH$_2$)$_3$—Si(OCH$_3$)$_3$, o-, m- or p-CH$_3$C(H)(X)—C$_6$H$_4$—O—(CH$_2$)$_2$—O—(CH$_2$)$_3$Si(OCH$_3$)$_3$, o-, m- or p-CH$_3$CH$_2$C(H)(X)—C$_6$H$_4$—O—(CH$_2$)$_2$—O—(CH$_2$)$_3$Si(OCH$_3$)$_3$ in each of the above formulas, X is a chlorine, bromine or iodine; and the like.

As the crosslinkable silyl group-containing organic halide, there may further be mentioned halides having the structure represented by the general formula 7:

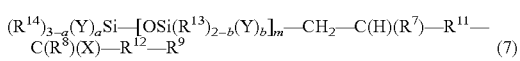  (7)

in the formula, R$^7$, R$^8$, R$^9$, R$^{11}$, R$^{12}$, R$^{13}$, R$^{14}$, a, b, m, X and Y are as defined above.

Specific examples of such compound include (CH$_3$O)$_3$SiCH$_2$CH$_2$C(H)(X)C$_6$H$_5$, (CH$_3$O)$_2$(CH$_3$)SiCH$_2$CH$_2$C(H)(X)C$_6$H$_5$, (CH$_3$O)$_3$Si(CH$_2$)$_2$C(H)(X)—

$CO_2R$, $(CH_3O)_2(CH_3)Si(CH_2)_2C(H)(X)—CO_2R$, $(CH_3O)_3Si(CH_2)_3C(H)(X)—CO_2R$, $(CH_3O)_2(CH_3)Si(CH_2)_3C(H)(X)—CO_2R$, $(CH_3O)_3Si(CH_2)_4C(H)(X)—CO_2R$, $(CH_3O)_2(CH_3)Si(CH_2)_4C(H)(X)—CO_2R$, $(CH_3O)_3Si(CH_2)_9C(H)(X)—CO_2R$, $(CH_3O)_2(CH_3)Si(CH_2)_9C(H)(X)—CO_2R$, $(CH_3O)_3Si(CH_2)_3C(H)(X)—C_6H_5$, $(CH_3O)_2(CH_3)Si(CH_2)_3C(H)(X)—C_6H_5$, $(CH_3O)_3Si(CH_2)_4C(H)(X)—C_6H_5$, $(CH_3O)_2(CH_3)Si(CH_2)_4C(H)(X)—C_6H_5$ in each of the above formulas, X is a chlorine, bromine or iodine and R is an alkyl group containing 1 to 20 carbon atoms, an aryl group or an aralkyl group; and the like.

The hydroxyl group-containing organic halide or halosulfonyl compound is not particularly restricted but includes such compounds as shown below:

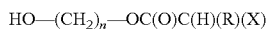
$HO—(CH_2)_n—OC(O)C(H)(R)(X)$ in each of the above formulas, X is a chlorine, bromine or iodine, R is a hydrogen atom or an alkyl group containing 1 to 20 carbon atoms, an aryl group or an aralkyl group and n is an integer of 1 to 20.

The amino group-containing organic halide or halosulfonyl compound is not particularly restricted but includes such compounds as shown below:

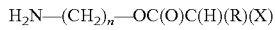
$H_2N—(CH_2)_n—OC(O)C(H)(R)(X)$ in each of the above formulas, X is a chlorine, bromine or iodine, R is a hydrogen atom or an alkyl group containing 1 to 20 carbon atoms, an aryl group or an aralkyl group and n is an integer of 1 to 20.

The epoxy group-containing organic halide or halosulfonyl compound is not particularly restricted but includes such compounds as shown below:

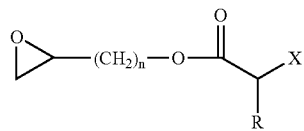

in each of the above formulas, X is a chlorine, bromine or iodine, R is a hydrogen atom or an alkyl group containing 1 to 20 carbon atoms, an aryl group or an aralkyl group and n is an integer of 1 to 20.

An organic halide or halosulfonyl compound having two or more initiation sites can also be used as the initiator. Specific examples are:

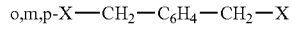
(i-1)

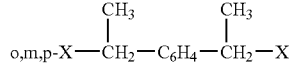
(i-2)

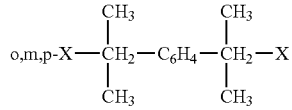
(i-3)

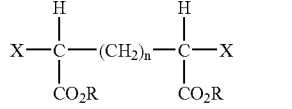
(i-4)

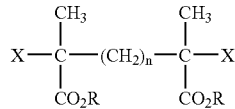
(i-5)

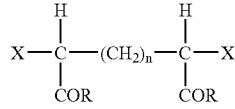
(i-6)

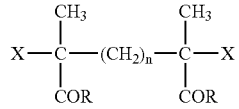
(i-7)

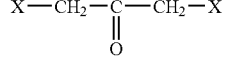
(i-8)

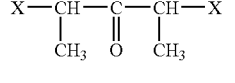
(i-9)

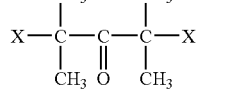
(i-10)

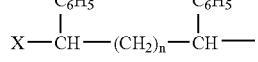
(i-11)

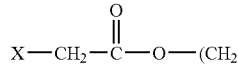
(i-12)

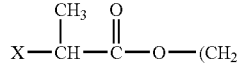
(i-13)

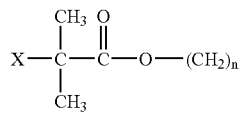
(i-14)

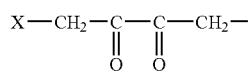
(i-15)

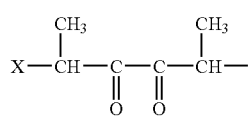
(i-16)

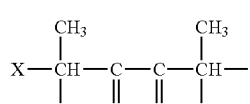
(i-17)

(i-18)

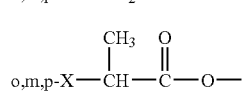
(i-19)

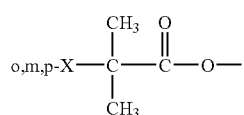
(i-20)

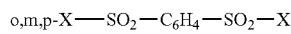  (i-21)

and the like.

The vinyl monomer to be used in this polymerization is not particularly restricted but those specifically mentioned hereinabove all can be used satisfactorily.

The transition metal complex to be used as the polymerization catalyst is not particularly restricted but preferably is a metal complex containing, as the central metal, an element of the group 7, 8, 9, 10 or 11 of the periodic table. As more preferred species, there may be mentioned complexes of zero-valence copper, univalent copper, bivalent ruthenium, bivalent iron or bivalent nickel. Among them, copper complexes are preferred. Specific examples of the univalent copper compound are cuprous chloride, cuprous bromide, cuprous iodide, cuprous cyanide, cuprous oxide, cuprous perchlorate and the like. In cases where a copper compound is used, a ligand, for example 2,2'-bipyridyl or a derivative thereof, 1,10-phenanthroline or a derivative thereof or a polyamine such as tetramethylethylenediamine, pentamethyldiethylenetriamine or hexamethyltris(2-aminoethyl) amine, is added for increasing the catalytic activity. The tristriphenylphosphine complex of bivalent ruthenium chloride ($RuCl_2(PPh_3)_3$) is also suited for use as the catalyst. In cases where a ruthenium compound is used as the catalyst, an aluminum alkoxide is added as an activator. Furthermore, the bistriphenylphosphine complex of bivalent iron ($FeCl_2(PPh_3)_2$), the bistriphenylphosphine complex of bivalent nickel ($NiCl_2(PPh_3)_2$) and the bistributylphosphine complex of bivalent nickel ($NiBr_2(PBu_3)_2$) are also suitable as catalysts.

The polymerization can be carried out without using any solvent or in any of various solvents. As the solvent species, there may be mentioned hydrocarbon solvents such as benzene and toluene, ether solvents such as diethyl ether and tetrahydrofuran, halogenated hydrocarbon solvents such as methylene chloride and chloroform, ketone solvents such as acetone, methyl ethyl ketone and methyl isobutyl ketone, alcohol solvents such as methanol, ethanol, propanol, isopropanol, n-butyl alcohol and tert-butyl alcohol, nitrile solvents such as acetonitrile, propionitrile and benzonitrile, ester solvents such as ethyl acetate and butyl acetate, and carbonate solvents such as ethylene carbonate and propylene carbonate, and the like. These may be used singly or two or more of them may be used in admixture. The polymerization can be carried out within the temperature range from room temperature to 200° C., preferably 50 to 150° C.

The terminus in atom transfer radical polymerization has a structure represented, for example, by the general formula 3:

$$—C(R^3)(R^4)(X) \quad (3)$$

in the formula, $R^3$ and $R^4$ are the same or different and each represents a hydrogen atom or univalent organic group derived from the group bound to the polymerizable carbon—carbon double bond group of the polymer-constituting vinyl monomer and X represents a chlorine, bromine or iodine.

As the terminal halogen group of the vinyl polymer (I), there may be mentioned a halogen group resulting from addition of an olefin compound having low polymerizability to a polymer terminus upon addition of that olefin compound during or at the endpoint of atom transfer radical polymerization.

Mainly for the purpose of terminally introducing a functional group, in atom transfer radical polymerization, in some cases, such an olefin compound having low polymerizability is added during or at the end of the polymerization to thereby cause that olefin to add to a polymer terminus.

The vinyl polymer (I) according to the present invention preferably has a terminal functional group other than the halogen group. More preferably, the vinyl polymer (I) of the invention has a crosslinkable terminal functional group [namely, a group to be involved in a following crosslinking reaction of the polymer obtained by the reaction of polymer (I) and oxy anion compound].

The vinyl polymer (I) is not particularly restricted but preferably has, at a terminus, at least one group selected from the group consisting of alkenyl, silyl, epoxy, hydroxyl and amino groups, more preferably an alkenyl group. When it has such a group, the present invention produces its effects more prominently in curable compositions in which that functional group is utilized, since terminal halogen groups may adversely affect the compositions in some cases.

The method of introducing such groups is not restricted but they are preferably introduced, in the above-mentioned atom transfer radical polymerization, by adding an olefin compound having low polymerizability during or at the end point of the polymerization.

The olefin compound is not particularly restricted but includes 1,5-hexadiene, 1,7-octadilene, 1,9-decadiene; 10-undecenol, 5-hexenol, allyl alcohol; trimethoxysilylpropyl (meth)acrylate, methyldimethoxysilylpropyl (meth)acrylate and the like.

<Method of halogen group treatment>

According to the present invention, the terminal halogen of the vinyl polymer (I) is replaced by the oxy anion compound, whereby the terminal halogen group is eliminated. The treatment with the oxy anion compound only results in introduction of an ester or ether linkage, hence the problems caused by the halogen, for example metal corrosion and storage stability problems, can be solved without causing changes in intrinsic physical properties of the resulting polymer. Furthermore, since the treatment with the oxy anion compound can proceed under very mild conditions, that treatment is also advantageous in that the other functional group of the polymer will not be consumed or the polymer main chain will not be decomposed or the characteristics of the polymer will not be degraded. In the following, the method of effecting substitution with the oxy anion compound is described in detail.

As the oxy anion compound, those specifically mentioned above can be used.

The method of preparing the oxy anion compound is not restricted but may beprepared from an alcohol, such as methanol, ethanol or butanol; or a carboxylic acid, such as acetic acid or benzoic acid.

The oxy anion compound can be prepared by reacting the above precursor with a base. The base may be any of various ones. Examples thereof are sodium methoxide, potassium methoxide, lithium methoxide, sodium ethoxide, potassium ethoxide, lithium ethoxide, sodium tert-butoxide, potassium tert-butoxide, sodium carbonate, potassium carbonate, lithium carbonate, sodium hydrogen carbonate, sodium hydroxide, potassium hydroxide, sodium hydride, potassium hydride, methyllithium, ethyllithium, n-butyllithium, tert-butyllithium, lithium diisoprqpylamide, lithium hexamethyldisilazide; alkylamines such as trimethylamine, triethylamine and tributylamine; polyamines such as tetramethylethylenediamine and pentamethyldiethylenetriamine; pyridine compounds such as pyridine and picoline;

and the like. The base is used in an amount of 0.5 to 5 equivalents, preferably 0.8 to 1.2 equivalents, relative to the above precursor.

As the solvent which can be used in reacting the above precursor with the above base, there may be mentioned, hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate, and amide solvents such as dimethylformamide and dimethylacetamide. These may be used singly or two or more of them may be used in admixture.

A more specific production method of the above oxy anion compound is now further described. When, for example, o-, m- or p-$CH_3$—$C_6H_4$—OH is used as the precursor, the base, for example potassium tert-butoxide, is charged into a reaction vessel under an inert gas atmosphere and suspended and dispersed in a solvent such as dimethylacetamide. The above methylphenol is added in an equimolar amount to this dispersion and the reaction is allowed to proceed at room temperature to 70° C. for 30 minutes to 1 hour, whereupon the oxy anion compound resulting from substitution of potassium for the acidic proton is obtained.

Those oxy anion compounds in which $M^+$ is a quaternary ammonium ion are obtainable by directly reacting the above precursor with an alkylamine or a pyridine compound. They can also be obtained by preparing an oxy anion compound in which $M^+$ is an alkali metal ion by the above method and then reacting this with a quaternary ammonium halide. The quaternary ammonium halide is, for example, tetramethylammonium halide, tetraethylammonium halide, trimethylbenzylammonium halide, trimethyldodecylammonium halide or tetrabutylammonium halide.

In the practice of the present invention, the oxy anion compound is preferably one not having a functional group other than an oxy anion group. Further, the oxy anion compound is preferably free of any crosslinkable functional group [namely, a group to be involved in a following crosslinking reaction of the polymer obtained by reaction between the polymer (I) and the oxy anion compound].

By reacting the oxy anion compound prepared in the above manner with the vinyl polymer (I) obtained by the production method mentioned hereinabove, it is possible to eliminate the halogen from the polymer.

The reaction conditions in treating the halogen group with the oxy anion compound are not particularly restricted but a polar solvent is preferably used as a solvent. The solvent preferably includes, but is not limited to, amide solvents, more preferably N,N-dimethylacetamide (DMAc) and N,N-dimethylformamide (DMF). The reaction temperature is not restricted but the reaction can be carried out at room temperature to 200° C., preferably at 50° C. to 150° C. The oxy anion compound is used in an amount of 1 to 5 equivalents, preferably 1 to 2 equivalents, more preferably 1 to 1.2 equivalents, relative to the halogen group.

As compared with the halogen group represented by the general formula 3:

(in the formula, $R^3$ and $R^4$ are the same or different and each represents a hydrogen atom or a univalent organic group derived from the group bound to the polymerizable carbon—carbon double bond group of the vinyl monomer andix represents a chlorine, bromine or iodine), a halogen group resulting from addition of an olefin compound having low polymerizability to a polymer terminus upon addition of the olefin compound during or at the endpoint of atom transfer radical polymerization is lower in reactivity and severer conditions are required, for example a high temperature and the use of the oxy anion in excess. It is one of the characteristic features of the present invention that such a low reactivity halogen group can also be treated.

<Silylation>

Those polymers after halogen group treatment which have an alkenyl group can be converted to crosslinkable silyl group-containing vinyl polymers by causing a crosslinkable silyl group-containing hydrosilane compound to add thereto, and the storage stability of the resulting crosslinkable silyl group-containing vinyl polymers can be improved by the preceding halogen group treatment according to the present invention.

The crosslinkable silyl group containing hydrosilane compound mentioned above is not particularly restricted but typically includes compounds represented by the general formula (8):

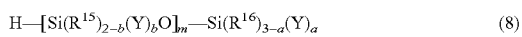

in the formula, $R^{15}$ and $R^{16}$ are the same or different and each represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO$— (in which R' is a univalent hydrocarbon group containing 1 to 20 carbon atoms and the three R' groups may be the same or different) and, when there are two or more $R^{15}$ or $R^{16}$ groups, the may be the same or different; Y represents a hydroxyl group or a hydrolysable group and, when there are two or more Y groups, they may be the same or different; a represents 0, 1, 2 or 3, b represents 0, 1 or 2 and m represents an integer of 0 to 19, provided that the relation a+mb≧1 should be satisfied.

The above hydrolysable group represented by Y is not particularly restricted but may be any of those known in the art, specifically a hydrogen atom, halogen atoms, alkoxy, acyloxy, ketoximate, amino, amide, acid amide, aminoxy, mercapto, alkenyloxy groups, and the like. Among them, alkoxy groups are preferred in view of their mild hydrolyzability and ease of handling. One to three hydrolysabie groups and/or hydroxyl groups represented by above Y may be bound to one silicon atom. Further, a+mb, namely the total number of hydrolysable groups and/or hydroxyl groups, is preferably within the range of 1 to 5. When two or more hydrolysable groups are bound to one silicon atom, they may be the same or different. The number of silicon atoms constituting the above hydrosilane compound may be 1 or 2 or more and, in the case of silicon atoms connected by siloxane bonding, that number may be up to about 20.

In the present description, the term "crosslinkable silyl group" indicates a silyl group where above Y group or groups bound to and which can form an —Si—O—Si—crosslink(s) by means of the hydroxyl group(s) or the hydroxyl group(s) formed upon hydrolysis of the hydrolysable group(s).

As specific examples of $R^{15}$ and $R^{16}$ in the above general formula (8), there may be mentioned, for example, alkyl groups such as methyl and ethyl; cycloalkyl groups such as cyclohexyl; aryl groups such as phenyl; aralkyl groups such as benzyl; and triorganosilyl groups represented by (R')$_3$SiO— in which R' is methyl or phenyl, for instance.

As typical examples of the hydrosilane compound represented by the above general formula (8), there may be mentioned HSiCl$_3$, HSi(CH$_3$)Cl$_2$, HSi(CH$_3$)$_2$Cl, HSi(OCH$_3$)$_3$, HSi(CH$_3$)(OCH$_3$)$_2$, HSi(CH$_3$)$_2$OCH$_3$, HSi(OC$_2$H$_5$)$_3$, HSi(CH$_3$)(OC$_2$H$_5$)$_2$, HSi(CH$_3$)$_2$OC$_2$H$_5$, HSi(OC$_3$H$_7$)$_3$, HSi(C$_2$H$_5$)(OCH$_3$)$_2$, HSi(C$_2$H$_5$)$_2$OCH$_3$, HSi(C$_6$H$_5$)(OCH$_3$)$_2$, HSi(C$_6$H$_5$)$_2$(OCH$_3$), HSi(CH$_3$)(OC(O)CH$_3$)$_2$, HSi(CH$_3$)$_2$O—[Si(CH$_3$)$_2$—O]$_2$—Si(CH$_3$)(OCH$_3$)$_2$, HSi(CH$_3$)[(O—N=C(CH$_3$)$_2$]$_2$ in each formula, C$_6$H$_5$ represents a phenyl group, and so on.

Among the hydrosilane compounds of the general formula (8), hydrosilane compounds represented by the general formula:

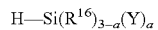

in the formula, R$^{16}$, Y and a are as defined above, are particularly preferred because of their ready availability.

The vinyl polymer having the above-mentioned hydrolyzable silyl group at a main chain terminus can be produced by the method mentioned later herein.

In causing the above-mentioned crosslinkable silyl group-containing hydrosilane compound to add to a vinyl polymer having an alkenyl group at a main chain terminus, a hydrosilylation catalyst is used. This hydrosilylation catalyst is not particularly restricted but may be a radical initiator, such as an organic peroxide or azo compound, or a transition metal catalyst, and so forth.

The above radical initiator is not particularly restricted but may be any of various ones, for example dialkyl peroxides such as di-tert-butyl peroxide, 2,5-dimethyl-2,5-di(tert-butylperoxy)hexane, 2,5-dimethyl-2,5-di-(tert-butylperoxy)-3-hexyne, dicumyl peroxide, tert-butyl cumyl peroxide and α, α'-bis(tert-butylperoxy)isopropylbenzene, diacyl peroxides such as benzoyl peroxide, p-chlorobenzoyl peroxide, m-chlorobenzoyl peroxide, 2,4-dichlorobenzoyl peroxide and lauroyl peroxide; peracid esters suchas tert-butyl perbenzoate; peroxydicarbonates such as diisopropyl peroxydicarbonate and di-2-ethylhexyl peroxydicarbonate; peroxyketals such as 1,1-di(tert-butylperoxy)cyclohexane and 1,1-di-(tert-butylperoxy)-3,3,5-trimethylcyclohexane.

The above transition metal catalyst is not particularly restricted but includes, simple substance platinum, solid platinum dispersed on a carrier such as alumina, silica or carbon black, chloroplatinic acid, chloroplatinic acid-alcohol, aldehyde or ketone complexes, platinum-olefin complexes, platinum(0)-divinyltetramethyldisiloxane complexes, and the like. As examples ofthe catalyst other than platinum compounds, there may be mentioned RhCl(PPh$_3$)$_3$, RhCl$_3$, RuCl$_3$, IrCl$_3$, FeCl$_3$, AlCl$_3$, PdCl$_2$·H$_2$O, NiCl$_2$, TiCl$_4$ and the like. These catalysts may be used singly or two or more of them may be used in combination.

<Addition type curing>

Based on the vinyl polymer of the invention which has an alkenyl group at a main chain terminus, it is possible to prepare a curable composition comprising the same as a main component. Thus, the curable composition of the present invention comprises (A) the vinyl polymer of the present invention which has an alkenyl-terminated main chain and (B) a hydrosilyl group-containing compound.

The (A) component vinyl polymer may be used singly or two or more species may be used in admixture. The molecular weight of the (A) component is not particularly restricted but preferably is withinthe range of 500 to 100,000, more preferably within the range of 3,000 to 50,000. If it is less than 500, the characteristics intrinsic in vinyl polymers are hardly manifested and, if it is above 100,000, the viscosity becomes very high or the solubility becomes low, hence polymer handling becomes difficult.

The (B) component, namely hydrosilyl group-containing compound, is not particularly restricted but may be any of various ones. Thus, usable are linear polysiloxanes represented by the following general formula (9) or (10):

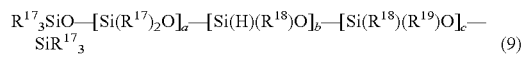

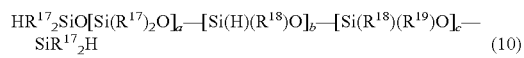

in the formula, R$^{17}$ and R$^{18}$ are the same or different and each represents an alkyl group containing 1 to 6 carbon atoms or a phenyl group, R$^{19}$ represents an alkyl group containing 1 to 10 carbon atoms or an aralkyl group containing 7 to 10 carbon atoms a represents an integer of 0 to 100, b represents an integer of 2 to 100 and c represents an integer of 0 to 100; and cyclic polysiloxanes represented by the following general formula (11):

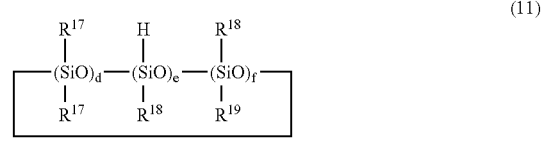

in the formula, R$^{17}$ and R$^{18}$ each represents an alky group containing 1 to 6 carbon atoms or a phenyl group, R$^{19}$ represents an alkyl group containing 1 to 10 carbon atoms or an aralkyl group containing 7 to 10 carbon atoms, d represents an integer of 0 to 8, e represents an integer of 2 to 10, f represents an integer of 0 to 8 and d, e and f satisfy the relation 3≦d+e+f≦10.

These may be used singly or two or more of them may be used in admixture. Among these polysiloxanes, phenyl group-containing polysiloxanes are preferred in view of their compatibility with vinyl polymers. As examples of such compounds, there may be mentioned linear siloxanes represented by the general formula (12) or (13) given below and cyclic polysiloxanes represented by the general formula (14) or (15) given below:

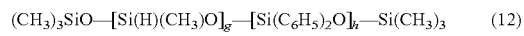

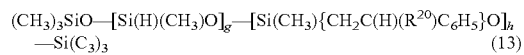

in the formula, R$^{20}$ represents a hydrogen or a methyl group, g represents an integer of 2 to 100, h represents an integer of 0 to 100 and C$_6$H$_5$ is a phenyl group;

-continued

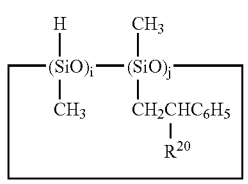
(15)

in the formula, $R^{20}$ represents a hydrogen or a methyl group, i represents an integer of 2 to 10, j represents an integer of 0 to 8, i and j satisfy the relation $3 \leq i+j \leq 10$ and $C_6H_5$ is a phenyl group.

Further, as the (B) component hydrosilyl group-containing compounds, compounds obtainable by reacting a low-molecular compound having two or more alkenyl groups within the molecule with a polysiloxane represented by one of the above general formulas (9) to (15) in the manner of addition reaction so that the hydrosilyl groups may partly remain even after the reaction can be used. Various compounds can be used as the above low-molecular compound having two or more alkenyl groups. As examples, there may be mentioned hydrocarbon compounds such as 1,4-pentadiene, 1,5-hexadiene, 1,6-heptadiene, 1,7-octadiene, 1,8-nonadiene and 1,9-decadiene; ether compounds such as O,O'-diallylbisphenol A and 3,3'-diallylbisphenol A; ester compounds such as diallyl phthalate, diallyl isophthalate, triallyl trimellitate and tetraallyl pyromellitate; and carbonate compounds such as diethylene glycol diallyl carbonate, and so forth.

Such compounds can be prepared by adding a small amount of the above alkenyl group-containing low-molecular compound dropwise slowly to the polysiloxane represented by one of the general formulas (14) to (20) in the presence of a hydrosilylation catalyst. Among such compounds, those compounds shown below are preferred in view of the ready availability of raw materials, the ready removability of the hydrosilyl group-containing compound used in excess and the compatibility with the (A) component vinyl polymer.

in the above formulas, n is 2, 3 or 4 and m is an integer of 5 to 10.

In the curable composition of the present invention, the vinyl polymer (A) and hydrosilyl group-containing compound (B) can be mixed together in arbitrary proportions. From the curability viewpoint, however, the mole ratio between the alkenyl group and hydrosilyl group is preferably within the range of 0.2 to 5, more preferably 0.4 to 2.5. If that ratio is above 5, curing becomes insufficient and sticky curing products low in strength can only be obtained. If it is less than 0.2, a large amount of the active hydrosilyl group remains in curing products even after curing, causing cracking or void formation, hence no uniform and strong curing products can be obtained.

The curing reaction between the component (A) and the component (B) proceeds with mixing and heating two components. For accelerating the reaction, a hydrosilylation catalyst may further be added. Such hydrosilylation catalyst is not particularly restricted but may be any of those already mentioned hereinabove. The catalyst amount is not particularly restricted but preferably is within the range of $10^{-1}$ to $10^{-8}$ mole, more preferably within the range of $10^{-3}$ to $10^{-6}$ mole, per mole of the alkenyl group in the component (A). If it is less than $10^{-8}$ mole, curing will not proceed to a satisfactory extent. Since the hydrosilylation catalyst is expensive, it is preferred that it be not used in an amount exceeding $10^{-1}$ mole.

When, in the above curable composition, the two components (A) and (B) are mixed up, if necessary together with the above-mentioned hydrosilylation catalyst, to thereby allow the curing to proceed, uniform curing products excellent in depth curability can be obtained without such an accompanying phenomenon as foaming. The curing conditions are not particularly restricted but, recommendably, the curing is generally carried out at 0° C. to 200° C., preferably at 30° C. to 150° C., for 10 seconds to 24 hours. At a high temperature of 80° C. to 150° C., some compositions may cure in a period as short as 10 seconds to about an hour. The properties of the curing products depend on the main chain skeleton or molecular weight of the vinyl polymer (A) and of the hydrosilyl group-containing compound (B), and prod-

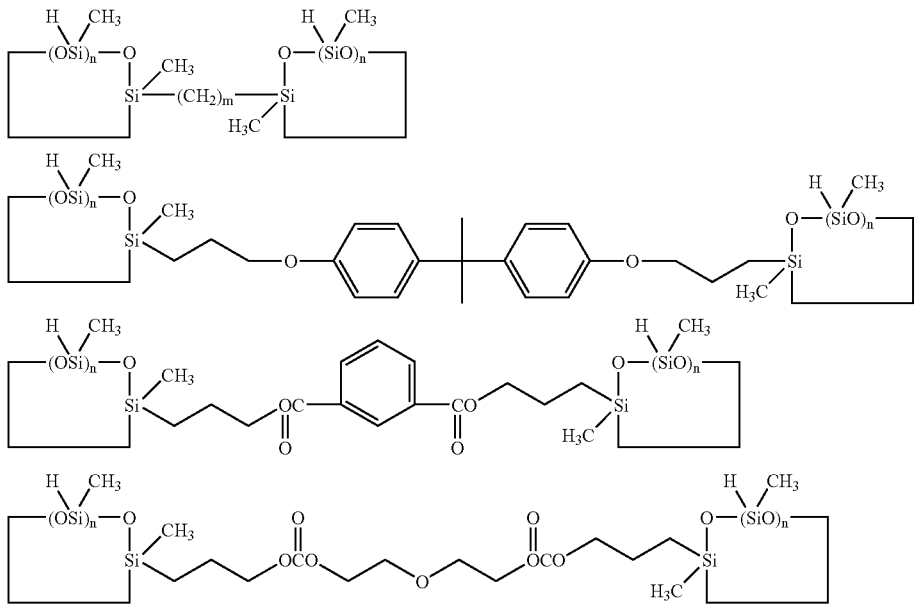

17. The production method according to claim 1, ucts widely ranging from rubber-like to resinous ones can be formed. As specific uses of the curing products obtainable from the above curable composition, there may be mentioned, for example, sealing materials, adhesives, pressure-sensitive adhesives, elastic adhesives, coatings, powder coatings, foamed or expanded articles, potting agents for use in electric and electronic industries, films, gaskets, various molding materials, artificial marble and the like.

<Condensation type curable composition>

In the practice of the present invention, a curable composition comprising the above-mentioned crosslinkable silyl group-containing vinyl polymer as a main component can also be prepared. By treating the halogen group by the method of the present invention, it is possible to improve the storage stability of the above curable composition and to prevent various materials (in particular metals and, further, materials for use in electric or electronic industries) coming into contact with the curable composition from being corroded.

In this curable composition, the main component, namely the vinyl polymer having a crosslinkable silyl group at a main chain terminus, may comprise a single species or a mixture of two or more species. The molecular weight thereof is not particularly restricted but is preferably within the range of 500 to 100,000, more preferably within the range of 3,000 to 50,000. If it is less than 500, the characteristics intrinsic in vinyl polymers having a crosslinkable silyl group at a main chain terminus are hardly manifested and, if it is above 100,000, polymer handing becomes difficult.

The vinyl polymer having a crosslinkable silyl group at a main chain terminus, when it comes into contact with water or moisture, undergoes a crosslinking reaction and becomes three-dimensional, hence is cured. Since the rate of hydrolysis varies depending on the temperature, humidity and crosslinkable silyl group species, an appropriate crosslinkable silyl group should be selected according to the use conditions. In storing the vinyl polymer having a crosslinkable silyl group at a main chain terminus, it is necessary to avoid the contact with moisture as far as possible.

For promoting the curing reaction of the above curable composition, a curing catalyst may be added. The catalyst includes alkyl titanates, organosilicon titanates; carboxylic acid metal salts such as stannous octylate and dibutyltin dilaurate; and amine salts such as dibutylamine 2-ethylhexanoate, and so forth. Other acidic and basic catalysts can also be used. The level of addition thereof is not particularly restricted but is preferably 0.01 to 5% by weight relative to the vinyl polymer having a crosslinkable silyl group at a main chain terminus.

When the above curing catalyst is admixed as necessary with the vinyl polymer having a crosslinkable silyl group at a main chain terminus, which is the main component, and curing is allowed to proceed, uniform curing products can be obtained. The curing conditions are not particularly restricted but, generally, curing is effected at 0 to 100° C., preferably 10 to 50° C., for about 1 hour to about 1 week. While the properties of the curing products depend on the main chain skeleton or molecular weight of the polymer used, a wide variety of products, from rubber-like ones to resinous ones, can be produced.

As specific uses of the above curing products, there may be mentioned sealing materials, adhesives, pressure-sensitive adhesives, elastic adhesives, coatings, powder coatings, foamed articles, potting agents for use in electric and electronic industries, films, gaskets, various molding materials, artificial marble and the like.

BEST MODES FOR CARRYING OUT THE INVENTION

In the following, typical examples of this invention are described together with certain comparative examples. The following examples, however, are by no means limitative of the scope of the present invention.

In the following examples and comparative examples, "part(s)" and "%" indicate "part(s) by weight" and "% by weight", respectively.

In the following examples, the "number average molecular weight" and "molecular weight distribution (ratio of weight average molecular weight to number average molecular weight)" were calculated by the standard polystyrene equivalent method using gel permeation chromatography (GPC). The GPC column used was one packed with a crosslinked polystyrene gel (Shodex GPC K-804; product of Showa Denko) and the GPC solvent used was chloroform.

PRODUCTION EXAMPLE 1

Example of Production of a Vinyl Polymer having Both an Alkenyl Group and a Halogen Group A 2-liter separable flask equipped with a reflux condenser a and a stirrer was charged with CuBr (8.4 g, 58.5 mmol) and the reaction vessel inside was purged with nitrogen. Acetonitrile (112 mL) was added, and the mixture was stirred at 70° C. on an oil bath for 30 minutes. Thereto were added butyl acrylate (200 g), diethyl 2,5-dibromoadipate (35.1 g, 97.5 mmol) and pentamethyldiethylenetriamine (hereinafter referred to as "triamine") (1.0 mL, 0.84 g, 4.9 mmol), and the reaction was thus started. While heating at 70° C. with stirring, butyl acrylate (800 g) was added dropwise continuously over 2.5 hours. During dropping of butyl acrylate, triamine (1.0 mL) was supplemented. After the lapse of 4.5 hours after starting the reaction, 1,7-octadiene (144 mL, 107 g, 975 mmol) was added and, then, heating at 70° C. was continued with stirring for 19 hours.

The reaction mixture was diluted with toluene, the dilution was passed through an activated alumina column and the volatile matter was distilled off under reduced pressure to give an alkenyl-terminated polymer (polymer [1]). The polymer [1] had a number average molecular weight of 13,300 and a molecular weight distribution of 1.29.

Elemental analysis revealed the bromine content in polymer [1] to be 1.1%.

EXAMPLE 1

Example of Br Treatment

A 2-liter round-bottom flask equipped with a reflux condenser was charged with the polymer [1] (500 g), potassium benzoate (24 g) and N,N-dimethylacetamide (500 mL), and the mixture was heated at 70° C. with stirring under a nitrogen stream for 11 hours. The N,N-dimethylacetamide was distilled off under reduced pressure, and the residue was then diluted with toluene. The toluene-insoluble solid matter KBr and excess potassium benzoate) was filtered off through an activated alumina column. The volatile matter was distilled off from the filtrate under reduced pressure to give a polymer (polymer [2]).

Elemental analysis revealed the bromine content in polymer 10 (21 to be 0.1%.

EXAMPLE 2

Example of Polymer Purification

A 2-liter round-bottom flask equipped with a reflux condenser was charged with the polymer [2] (500 g), aluminum silicate (50 g, product of Kyowa Chemical, Kyowaad 700 PEL) and toluene (1.5 L), and the mixture was heated at 100° C. with stirring under a nitrogen stream for 3 hours. The aluminum silicate was filtered off and the toluene was distilled off from the filtrate under reduced pressure to give a polymer [3].

EXAMPLE 3

Alkenyl Group Silylation Reaction

The polymer [3] was used as a Br-deprived polymer. A 1-liter pressure reactor was charged with the polymer [3] (315 g), dimethoxymethylhydrosilane (14.9 mL, 0.12 mol), dimethyl orthoformate (4.4 mL, 0.04 mmol) and the platinum(0)-1,1,3,3-tetramethyl-1,3-divinyldisiloxane complex. The platinum catalyst was used in an amount of $5 \times 10^{-4}$ equivalents per mole of the alkenyl group in the polymer. The reaction mixture was heated at 100° C. for 1 hour. The volatile matter was distilled off from the mixture under reduced pressure to give a silyl-terminated polymer (polymer (4]). It was confirmed by $^1$H NMR analysis that the alkenyl group of polymer [1] had been completely disappeared and the silylation had occurred.

The polymer [4] was stored in a container at 25° C. for 1 week. No gelation occurred and the fluidity was maintained. Thus, the storage stability was improved by treating the bromine group in the polymer.

Comparative Example 1

In lieu of the polymer [2] in Example 2, the polymer [1] was used as a polymer not yet deprived of Br. A polymer [5] was obtained in the same manner except that polymer [1] was used in lieu of polymer [2].

Comparative Example 2

Alkenyl group silylation was carried out in the same manner as in Example 3 except that the polymer [5] was used in lieu of the polymer [3] to give a silyl group-terminated polymer (polymer [6]). The polymer [6] gelated immediately after isolation, however.

Production Example 2

A 2-liter separable flask equipped with a reflux condenser and a stirrer was charged with CuBr (22.4 g, 156 mmol) and the reaction vessel inside was purged with nitrogen. Acetonitrile (112 mL) was added, and the mixture was stirred at 70° C. on an oil bath for 30 minutes. Thereto were added butyl acrylate (200 g), methyl 2-bromopropionate (86.9 g, 520 mmol) and pentamethyldiethylenetriamine (hereinafter referred to as "triamine") (0.19 mL, 0.18 g, 1. 0 mmol), and the reaction was thus started. While heating at 70° C. with stirring, butyl acrylate (800 g) was added dropwise continuously over 150 minutes. During polymerization, the triamine (18mL) was added in divided portions. After the lapse of 520 minutes after starting the reaction, the polymerization was terminated.

The reaction mixture was diluted with toluene, the dilution was passed through an activated alumina column and the volatile matter was distilled off under reduced pressure to give a poly(butyl acrylate) polymer having a Br group as represented by the formula shown below at one terminus (polymer [7]). The polymer [7] had a number average molecular weight of 2,600 and a molecular weight distribution of 1.21.

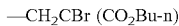

EXAMPLE 4

A 2-liter separable flask equipped with a reflux condenser and a stirrer was charged with the polymer [7] (940 g), potassium acetate (73.5 g) and N,N-dimethylacetamide (800 mL), and the mixture was heated at 70° C. with stirring under a nitrogen stream for 3 hours. The N,N-dimethylacetamide was distilled off under reduced pressure, and the residue was then diluted with toluene. The toluene-insoluble solid matter (KBr and excess potassium acetate) was filtered off through an activated alumina column. The volatile matter was distilled off from the filtrate under reduced pressure to give a polymer [8].

EXAMPLE 5

A silyl group-terminated polymer produced in the same manner as in Example 3 (Mn=23,300, molecular weight distribution 1.39, 50 g) and the polymer [8] (25 g) were admixed with 0.5 g each of two antioxidants (Irganox 1010 and Tinuvin 213; products of Ciba Specialty Chemicals), 0.5 g of a dehydrating agent (A-171; product of Nippon Unicar) and 1 g of a curing agent (U-220; product of Nitto Chemical) and the composition thus prepared under dehydrating conditions was stored at 50° C. Even after 4 weeks, it was stable without showing any sign of gelation.

Comparative Example 3

A composition was prepared in the same manner as in Example 5 except that the polymer [7] was used in lieu of the polymer [8] and stored at 50° C. After 4 weeks, it gelated.

Production Example 3

Copolymer Production

A 10-liter separable flask equipped with a reflux condenser and a stirrer was charged with CuBr (36.02 g, 0.2511 mmol) and the reaction vessel inside was purged with nitrogen. Acetonitrile (618 mL) was added, and the mixture was stirred at 70° C. on an oil bath for 15 minutes. Thereto were added butyl acrylate (360 mL, 2.51 mol), ethyl acrylate (500 mL, 4.62 mol), 2-methoxyethyl acrylate (375 mL, 2.91 mol), diethyl 2,5-dibromoadipate (150.68 g, 0.419 mol) and pentamethyldiethylenetriamine (hereinafter referred to as "triamine") (2.18 mL, 1.81 g, 10.46 mmol), and the reaction was thus started. While heating at 70° C. with stirring, a mixture composed of butyl acrylate (1,440 mL), ethyl acrylate (2,002 mL) and 2-methoxyethyl acrylate (1,498 mL) was added dropwise continuously over 210 minutes. During dropping of the monomers, the triamine (7.63 mL, 6.33 g, 36.5 mmol) was supplemented. After the lapse of 330 minutes after starting the reaction, 1,7-octadiene (1,236 mL, 922 g, 8.37 mol) and the triamine (26.16 mL, 21.71 g, 0.125 mol) were added and, then, heating at 70° C. was continued with stirring for 250 minutes.

The reaction mixture was diluted with toluene and the dilution was passed through an activated alumina column and the volatile matter was distilled off under reduced pressure to give analkenyl-terminated copolymer (alkenyl-terminated poly(butyl acrylate/ethyl acrylate/methoxyethyl acrylate) copolymer; copolymer [9]).

EXAMPLE 6

A 10-liter separable flask equipped with a reflux condenser was charged with the copolymer [9] (2 87 kg), potassium acetate (79.57 g) and N,N-dimethylacetamide (2.9 L), and the mixture was heated at 100° C. with stirring under a nitrogen stream for 12 hours. The N,N-dimethylacetamide was distilled off by heating under reduced pressure, and the residue was then diluted with toluene. The toluene-insoluble solid matter (KBr and excess potassium acetate) was filtered off through an activated alumina column. The volatile matter was distilled off from the filtrate under reduced pressure to give a copolymer [10].

A 10-liter separable flask equipped with a reflux condenser was charged with the copolymer [10] 2.87 kg), acidic aluminum silicate (143 g, product of Kyowa Chemical, Kyowaad 700 SL), basic aluminum silicate (143 g, product of Kyowa Chemical, Kyowaad 500 SH) and toluene (5.2 L), and the mixture was heated at 100° C. with stirring under a nitrogen stream for 7 hours. The aluminum silicate was filtered off and the toluene was distilled off from the filtrate under reduced pressure to give a vinyl-terminated copolymer (copolymer [11]). The copolymer obtained had a number average molecular weight of 18,000 as determined by GPC (on the polystyrene equivalent basis) and a molecular weight distribution of 1.24. The number of vinyl groups as introduced per copolymer molecule was determined by $^1$H NMR analysis and found to be 2.2.

EXAMPLE 7

Addition Type Curing

The copolymer [3] (20 g) obtained in Example 6 was admixed with 1.54 g of a linear siloxane (containing 5 (on average) hydrosilyl groups and 5 (on average) α-methylstyrene groups in each molecule; Si-H group content 3.70 mmol/g) as a curing agent. To this mixture was added the bis(1,3-divinyl-1,1,3,3-tetramethyldisiloxane) platinum complex catalyst ($1.32 \times 10^{-5}$ mmol/μl, xylene solution) as a curing catalyst. After thorough mixing, the resulting curable composition was heated in an oven at 150° C. The composition quickly cured and gave a rubber-like curing product.

INDUSTRIAL APPLICABILITY

According to the present invention, the terminal halogen group of a vinyl polymer can be treated with ease. As a result, the storage stability of the polymer itself or of a curable composition comprising the polymer can be improved and reaction apparatus and various materials coming into contact with the polymer can be prevented from being corroded. In particular, the storage stability of a crosslinkable silyl group-containing polymer can be markedly improved.

What is claimed is:

1. A production method of a vinyl polymer comprising
   treating a halogen group-containing vinyl polymer (I) with an oxy anion compound to thereby reduce the halogen content of the polymer,
   wherein the oxy anion compound has no functional group other than an oxy anion group, and
   wherein a ratio (Mw/Mn) between weight average molecular weight (Mw) and number average molecular weight (Mn) of the vinyl polymer (I) is less than 1.8 as determined by gel permeation chromatography.

2. The production method according to claim 1, wherein the vinyl polymer (I) has a halogen group at a molecular chain terminus.

3. The production method according to claim 1, wherein the vinyl polymer (I) has a functional group other than a halogen group in a terminal structure thereof in addition to the halogen group.

4. The production method according to claim 3, wherein the functional group in the terminal structure of the vinyl polymer (I) is selected from the group consisting of alkenyl, hydroxyl, silyl, amino and epoxy groups.

5. The production method according to claim 4, wherein the functional group in a terminal structure of the vinyl polymer (I) is an alkenyl group.

6. The production method according to claim 1, wherein the oxy anion compound includes a group represented by the general formula 1:

$$M^+O^- - R^1 - \quad (1)$$

in the formula, $R^1$ represents an organic group, which may optionally contain one or more ether or ester linkages, and $M^+$ represents an alkali metal ion or a quaternary ammonium ion.

7. The production method according to claim 6, wherein, in the general formula 1, $R^1$ is an organic group represented by the following general formula 2:

$$-C(=O)-R^2- \quad (2)$$

in the formula, $R^2$ represents an organic group, which may optionally contain one or more ether or ester linkages.

8. The production method according to claim 6, wherein, in the general formula 1, $R^1$ is a bivalent organic group.

9. The production method according to claim 7, wherein, in the general formula 2, $R^2$ is an aromatic group.

10. The production method according to claim 6, wherein, in the general formula 1, $M^+$ is a potassium ion.

11. The production method according to claim 1, wherein the oxy anion compound comprises at least one salt selected from the group consisting of alkoxide salts, phenoxide salts and carboxylate salts, and the counter ion thereto is an alkali metal ion or a quaternary ammonium ion.

12. The production method according to claim 11, wherein the oxy anion compound is a monobasic or dibasic carboxylate salt.

13. The production method according to claim 11, wherein the oxy anion compound is a salt of an acid selected from the group consisting of benzoic acids and acetic acid.

14. The production method according to claim 1, wherein the vinyl polymer (I) is produced by atom transfer radical polymerization.

15. The production method according to claim 14, wherein the terminal halogen group of the vinyl polymer (I) has a structure represented by the general formula 3:

$$-C(R^3)(R^4)(X) \quad (3)$$

in the formula, $R^3$ and $R^4$ are the same or different and each represents a hydrogen atom or a univalent organic group respectively derived from a group bound to a polymerizable carbon—carbon double bond group in the vinyl monomer constituting said polymer, and X represents a chlorine, bromine or iodine.

16. The production method according to claim 14,
   wherein, in atom transfer radical polymerization, the terminal halogen group of the vinyl polymer (I) is a halogen group resulting from addition of an olefin compound having low polymerizability to a polymer terminus upon addition of the olefin compound during or at the end of the polymerization.

17. The production method according to claim 1,
   wherein the main chain of the vinyl polymer (I) is a (meth)acrylic polymer.
18. The production method according to claim 17,
   wherein the main chain of the vinyl polymer (I) is an acrylic polymer.
19. The production method according to claim 1,
   wherein the main chain of the vinyl polymer (I) is a styrenic polymer.
20. The production method according to claim 1,
   wherein the number average molecular weight of the vinyl polymer (I) is within the range of 500 to 100,000.

\* \* \* \* \*